(12) United States Patent
Horst et al.

(10) Patent No.: US 8,371,550 B2
(45) Date of Patent: Feb. 12, 2013

(54) EQUIPMENT HOLDER WITH OPTIONAL GRID FUNCTION

(75) Inventors: Markus Horst, Bad Oldesloe (DE); Benjamin Landes, Hamburg (DE); Anja Nitsche, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 254 days.

(21) Appl. No.: 12/845,527

(22) Filed: Jul. 28, 2010

(65) Prior Publication Data

US 2011/0024560 A1 Feb. 3, 2011

Related U.S. Application Data

(60) Provisional application No. 61/229,170, filed on Jul. 28, 2009.

(30) Foreign Application Priority Data

Jul. 28, 2009 (DE) .......................... 10 2009 034 997

(51) Int. Cl.
*B64D 11/00* (2006.01)
(52) U.S. Cl. ............... 248/503.1; 248/316.1; 244/118.5; 244/119
(58) Field of Classification Search ............... 248/316.1, 248/680, 681, 503, 500, 503.1, 225.21, 223.41, 248/222.13, 222.14, 223.31, 225.11; 244/118.1, 244/119, 118.5
See application file for complete search history.

(56) References Cited

U.S. PATENT DOCUMENTS

| 4,771,969 | A * | 9/1988 | Dowd .......................... 244/118.6 |
| 6,644,901 | B2 * | 11/2003 | Breckel .......................... 410/104 |
| 6,814,331 | B2 * | 11/2004 | Hessling ....................... 244/119 |
| 2003/0089825 | A1 * | 5/2003 | Hessling et al. ............... 244/119 |
| 2003/0209632 | A1 | 11/2003 | Hessling |
| 2006/0032155 | A1 | 2/2006 | Thomassin et al. |
| 2009/0136321 | A1 | 5/2009 | Kosiankowski et al. |

FOREIGN PATENT DOCUMENTS

| DE | 102 20 808 A1 | 5/2002 |
| DE | 10 2005 040 019 A1 | 3/2007 |
| EP | 1281577 A2 | 2/2003 |
| EP | 1619120 A1 | 1/2006 |
| EP | 1 924 777 | 3/2007 |
| WO | 2007023144 A1 | 3/2007 |

OTHER PUBLICATIONS

German Office Action for German Application No. 10 2009 034 997.9-22 mailed Jul. 26, 2010.

* cited by examiner

*Primary Examiner* — Anita M King
(74) *Attorney, Agent, or Firm* — Ingrassia Fisher & Lorenz P.C.

(57) ABSTRACT

An equipment holder is provided with an optional grid function for positioning a first cabin component of an aircraft relative to a second cabin component of the aircraft and for attaching the two cabin components to each other. The equipment holder includes, but is not limited to an attachment element, a fixing element, and a position determination device. In this arrangement the attachment element is designed to attach the equipment holder to the first cabin component. The fixing element is designed to fix a position of the equipment holder relative to the second cabin component. Furthermore, the position determination device is designed to discontinuously indicate the position of the equipment holder relative to the second cabin component with a position signal.

13 Claims, 3 Drawing Sheets

EQUIPMENT HOLDER WITH OPTIONAL GRID FUNCTION

REFERENCE TO RELATED APPLICATIONS

This application claims the benefit of the filing date of German Patent Application No. 10 2009 034 997.9 filed Jul. 28, 2009 and of U.S. Provisional Patent Application No. 61/229,170 filed Jul. 28, 2009, which are both incorporated herein by reference in their entirety.

TECHNICAL FIELD

The invention relates to an equipment holder with an optional grid function for positioning a first cabin component of an aircraft relative to a second cabin component of the aircraft and for attaching the two cabin components to each other. Furthermore, the invention relates to a holding system with an optional grid function and to a method for positioning a first cabin component of an aircraft relative to a second cabin component and for attaching the two cabin components. Moreover, the invention relates to an aircraft comprising an equipment holder according to the invention.

BACKGROUND

When assembling cabin components of an aircraft, for example on the final assembly line (FAL), it may be important to provide suitable holding devices that make it possible to achieve quick and non-complicated assembly. From DE 10 2005 040 019 A1 and the parallel printed publications US 2009 136 321 A1, WO 2007 023 144 A1 and EP 192 4777 A1 holding devices for holding objects to a vehicle wall are known.

Various factors may need to be taken into account in the installation of cabin components. On the one hand a high-quality connection or attachment of cabin components to each other and/or to the surrounding structures is important. On the other hand precise positioning of the cabin components relative to each other and/or to the surrounding structure may be important.

For example, in the assembly of overhead stowage compartments (OHSCs) and passenger supply units (PSUs) it can be particularly important to determine a position of a passenger supply unit underneath the stowage bin. This may, for example, make possible no-risk pre-cabling of the overhead stowage compartment.

SUMMARY

According to a first embodiment of the invention, an equipment holder with an optional grid function for positioning a first cabin component of an aircraft relative to a second cabin component and for attaching the two cabin components to each other is described. The equipment holder comprises an attachment element, a fixing element and a position determination device. In this arrangement the attachment element is designed to attach the equipment holder to the first cabin component. Furthermore, in this arrangement the fixing element is designed to fix a position of the equipment holder relative to the second cabin component. Furthermore, the position determination device is designed to discontinuously indicate the position of the equipment holder relative to the second cabin component by means of a position signal.

In other words, according to the first embodiment, the idea is based on discontinuous position determination by a position signal, by means of a position determination device. Position determination can, for example, take place in that the position determination device of the equipment holder locks into place at predetermined positions, for example at recesses of a grid rail, and emits a signal which indicates locking into place. Simultaneously with position determination, attachment of the equipment holder to the first cabin component can take place. Furthermore, for example, simultaneously with position determination, or following position determination, determination or fixing of the position by means of a fixing element can take place. This may provide an improved device that may make it possible at the same time both to attach cabin components to each other and to position them relative to each other.

The optional nature of position determination is reflected in that in the case of installation in special regions in which a position determination device would excessively limit the flexibility of the cabin components, the position determination device of the equipment holder need not be used.

Below, characteristics, details and possible advantages of a device according to embodiments of the invention are discussed in detail.

The equipment holder according to an exemplary embodiment of the invention can, for example, be a design element for attaching cabin components of an aircraft. The equipment holder comprises an optional grid function. In this context the term "optional" may signify that the grid function for determining a position may optionally be left out, for example if position determination of a cabin component is not necessary because said cabin component need not be positioned precisely and if time can be saved in this manner, or, as an alternative, if permanent positioning may not be possible.

In this context the term "grid function" may, for example, mean that the equipment holder is designed to be able to penetrate particular recesses, for example in the case of a grid rail. By means of the grid function, positioning of a cabin component, for example relative to a further cabin component, can be facilitated. The term "positioning" may, for example, refer to finding particular coordinates relative to the other cabin component or, for example, to the fuselage of an aeroplane.

In this arrangement the first cabin component may, for example, be a cabin component that is hooked into the cabin ceiling or that is attached to the cabin interior. For example, the first cabin component may be a passenger supply unit. The second cabin component may be a component to which the first cabin component is to be affixed. The second cabin component may, for example, be designed as a grid rail or strip. This grid rail may, for example, form part of an overhead stowage compartment. As an alternative, the grid rail may be arranged on the overhead stowage compartment.

In this arrangement, the aircraft may, for example, be an aeroplane or a helicopter. Furthermore, the aircraft can be designed for civil or military aviation. The aircraft can furthermore be a passenger aircraft and/or a cargo aircraft.

In this arrangement, the attachment element of the equipment holder is designed to attach the equipment holder to the first cabin component. In this arrangement the terms "attachment" or "attaching" may, for example, refer to coupling the first cabin component to the equipment holder in such a manner that they remain connected to each other even when subjected to some influence of force.

The attachment element may, for example, be designed as a hook or a screw. Furthermore, the attachment element may attach the equipment holder in a non-positive locking or in a positive-locking manner to the first cabin component. The equipment holder may also comprise several attachment elements, for example in the form of several screws or a combination of screws and hooks.

In this arrangement the fixing element is designed to affix a position of the equipment holder relative to the second cabin component. This means, for example, that the equipment holder is first placed and attached to the first cabin component. Subsequently the first cabin component, together with the equipment component, is affixed relative to the second cabin component. The equipment holder can comprise several fixing elements, for example in the form of several screws, or a combination of fixing elements.

The fixing element may, for example, be designed as a screw, a clamp or an expander-type fastening device. Furthermore, the fixing element may be designed to affix the position of the equipment holder in a non-positive locking manner or in a positive-locking manner.

The position determination device, which may indicate the position of the equipment holder relative to the second cabin component, can, for example, be designed as an elastic pin that can enter apertures or recesses of the second cabin component. As an alternative to this, the position determination device may, for example, be a light source on the equipment holder, which light source is designed to emit a light ray through apertures of the second cabin component.

In this arrangement, position determination is discontinuous; in other words only defined positions can be indicated. This can, for example, be the case in a grid rail, wherein the position determination device of the equipment holder can only show when the equipment holder is situated at a hole in the grid rail. In other words, positions that are arranged between the perforations of a grid rail are not shown.

In this arrangement a position signal can be an indication that has a particular significance that can correspond to certain information. The position signal may, for example, indicate the precise position at which the equipment holder, and possibly the first cabin component attached to it, is located. In addition or as an alternative the position signal may state whether the equipment holder is situated at a lock-in position, and possibly at what provided lock-in position the equipment holder is situated. The position signal can provide this information, for example, in a visual, acoustic or haptic manner.

Overall, for example, installation of a first cabin component, for example a PSU, on a grid rail by means of the equipment holder can take place as follows. First, for example, position determination by means of the position determination device takes place by insertion of the equipment holder in the grid rail. This can be followed by fixing the position of the equipment holder relative to the second cabin component, in other words on the grid rail. Subsequently, the first cabin component, i.e. the PSU unit, can be attached to the equipment holder and thus also to the grid rail. In this arrangement the position determination device can be designed in such a manner that position determination is optional, in other words the equipment holder can also be fixed to a non-perforated position, or to a position that is not provided for this purpose, of a grid rail. This is made possible by separation of the functions of attachment, fixing, and position determination.

The sequence of placement can, as an alternative, also differ from the one stated. For example, at first the first cabin component can be attached to the equipment holder and subsequently positioning and fixing can take place.

In the case of positioning and fixing cabin components by means of the equipment holder according to the invention, the installation work is facilitated considerably, which can possibly result in saving time during installation. Work is made easier as a result of the separation of the functions of the equipment holder, namely into attachment, affixation and position determination.

Furthermore, it may be advantageous that, for example prior to attachment of a first cabin component and prior to affixation, optional position determination can take place. In other words, during installation there is the option of carrying out precise position determination. However, if this is not possible, position determination is not mandatory, and consequently the equipment holder may not need to be exchanged for an attachment means that does not comprise an additional component for position determination.

According to an embodiment of the present invention, the position determination device is designed as an elastic grid element with a lug, i.e., a protrusion. In this arrangement the lug is designed to enter into a selected recess of the second cabin component.

In this component the term "elastic" may mean that the grid element may reversibly react to a force acting on it. The material from which the grid element is made may thus, for example, give when a force acts on it, and may return to its original shape when the force ceases to act. In this arrangement the elastic grid element may, for example, be completely elastic, or as an alternative, may comprise elastic components.

The elastic grid element comprises a lug or a pin that can enter recesses or perforations of the second cabin component. This means, for example, that the elastic grid element of the position determination device can enter a hole in a grid rail.

In this arrangement the selected recesses can, for example, be holes, which are, for example, arranged at regular spacing on the second cabin component. The equipment holder can be designed to be inserted in a grid rail and to be moved or guided along this rail in its interior.

The equipment holder can thus, for example, be designed to enter a selected recess of the second cabin component, for example the third one from the right. Thus, for example, an installing technician can detect from the outside, by means of the lug that is visible through a hole, at which position the equipment holder is located.

The elastic grid element with the lug facilitates position determination of the equipment holder and can correspond to the discontinuous position signal.

According to a further embodiment of the invention, the lug is designed to leave the recess of the second cabin component in response to a predetermined, e.g., to a slight, lateral or frontal pressure.

In the above context the term "slight pressure" can relate to pressure which a person is able to exert without much effort with one finger. This pressure can, for example, be exerted from the front, for example by a finger of an installing technician, i.e., frontal pressure. As an alternative, the pressure can be exerted laterally, i.e., from the side, in that the equipment holder is moved further to the right or left relative to the recess of the second cabin component.

As a result of this embodiment, the equipment holder can, for example, be moved along a grid rail until the lug of the elastic grid element appears at the desired position or recess in the grid rail.

According to a further embodiment of the invention, the equipment holder is designed to be inserted in a grid rail.

In this arrangement the fixing element can, for example, be situated within the grid rail. Furthermore, the position determination device, too, after insertion of the equipment holder in the grid rail, can be located within the grid rail and is, for example, visible only by a lug through a recess in the grid rail.

In this arrangement the grid rail or the grid strip can, for example, be designed as part of a further cabin component, for example an overhead stowage compartment. As an alternative, the grid rail can be attached to a further cabin component. The grid rail can furthermore correspond to the second cabin component. In other words, the second cabin component can be designed as a grid rail with a perforation. In this arrangement the perforation can, for example, be implemented on one or on two sides of the rail.

According to a further embodiment of the invention, the fixing element is furthermore designed to fix a third cabin component relative to the first cabin component.

In this arrangement the third cabin component may be a cabin component that communicates with the second cabin component. For example, the third cabin component can be an overhead storage unit to which the second cabin component is installed, for example in the form of a grid rail. For example, if the grid rail is firmly connected to the overhead stowage compartment, and if the equipment holder according to the invention is fixed to a predetermined position of the grid rail, then at the same time the position relative to the overhead stowage compartment is also determined. The fixing element can, for example, also penetrate the second cabin component and enter the third cabin component, where it is attached.

According to a further exemplary embodiment of the present invention, the position determination device is designed so as to be flexible in such a manner that optionally it can be inserted from the inside into a recess of the second cabin component.

In this arrangement the term "flexible" can denote that the position determination device is designed so as to be completely elastic. If the equipment holder is, for example, inserted from the inside into the second cabin component, for example into a grid rail, then the position determination device can be bent in such a manner that it is also located in the interior of the second cabin component. As an alternative, the position determination device can be bent in such a way that it is located outside the second cabin component, in other words, for example, so that it is arranged completely outside a grid rail. This may correspond to the optional nature of position determination of the equipment holder.

Such a design of the position determination device may provide an advantage in that the position determination device is not troublesome or is not in the way if position determination is either not necessary or not possible. Thus the equipment holder can be fixed to any desired position of the second cabin component.

According to a further embodiment of the present invention, the position signal comprises at least one signal from the following signal group: tactile signal, visual signal and acoustic signal.

In this arrangement a tactile signal can, for example, be a haptic signal by means of which an installing technician can precisely determine the position of the equipment holder by means of feeling the position determination device or a lug of said position determination device, which lug, for example, protrudes through a hole in a grid rail.

In this arrangement the term "visual signal" can mean that an installing technician can visually perceive, i.e. see, the position determination device at a particular position. For example, the technician can perceive the lug of the position determination device through a particular perforation of a grid rail and in this manner determine the position at which the equipment holder is. As an alternative, the position determination device can be designed as a visual source so that an installing technician sees illumination through a particular perforation of a grid rail and consequently can determine the position of the equipment holder and possibly of the first cabin component attached thereto.

An acoustic signal can, for example, involve clicking into place or snapping into place of the position determination device in recesses or perforations of the second cabin component. The acoustic signal can, for example, merely provide information as to whether or not the equipment holder is at a desired predetermined position.

A tactile signal can be associated with an advantage in that even in confined space and with installation of cabin components in locations that are difficult to access, the position can be determined, for example by feeling with one's hand. Similarly, direct visual contact for position determination by means of an acoustic signal is not mandatory. The position signal can at the same time comprise a tactile, a visual, and an acoustic signal.

According to a second embodiment of the present invention, a holding system with an optional grid function for positioning cabin components of an aircraft relative to each other and for attaching the cabin components to each other is described. In this arrangement the holding system comprises an equipment holder as described above and a second cabin component. In this arrangement the second cabin component comprises coding by means of which the position determination device interacts during discontinuous determination of the position of the equipment holder relative to the second cabin component.

In this arrangement, coding can, for example, correspond to perforation on a grid rail. In this case the position determination device can, for example, interact with the grid rail, for example by entering into the perforations of the grid rail during determination of the position of the equipment holder.

According to a further embodiment of the invention, the second cabin component is designed as a grid rail with recesses.

According to a further embodiment of the present invention, the first cabin component is a passenger supply unit.

In this arrangement the equipment holder can, for example, be designed to carry the weight of the passenger supply unit. To this effect the attachment element can, for example, be reinforced.

According to a third embodiment of the invention, a method for positioning a first cabin component of an aircraft relative to a second cabin component and for attaching the two cabin components to each other by means of an equipment holder as described above is described. The method comprises the following steps: attaching the equipment holder to a first cabin component by means of an attachment element; guiding the equipment holder along a second cabin component with recesses; determining the position of the equipment holder relative to the second cabin component by means of a discontinuous position signal with the use of a position determination device; and fixing the determined position of the equipment holder relative to the second cabin component by means of a fixing element.

In this arrangement the sequence of the steps can, as an alternative, also be different. For example, the equipment holder can first be guided along or within a second cabin component, in other words, for example, a grid rail with recesses, up to a desired position. Simultaneously or subsequently, position determination by means of the position determination device of the equipment holder can take place. Thereafter the determined position can be fixed and subsequently the first cabin component can be attached to the equipment holder at the determined fixed position by means of the attachment element.

According to a further embodiment of the invention, the step of determining the position of the equipment holder relative to the second cabin component using the position signal by means of the position determination device is optional. This means that attachment and affixation of the equipment holder may also take place without position determination.

According to a fourth embodiment of the invention, an aircraft comprising an equipment holder as presented above is described.

According to a further embodiment of the invention, the aircraft comprises a passenger supply unit and an overhead stowage compartment. In this arrangement the equipment holder is designed to position the passenger supply unit and the overhead stowage compartment relative to each other, and to attach them to each other.

With reference to the enclosed drawings to the average person skilled in the art, further characteristics and advantages of the present invention will become obvious from the following description of exemplary embodiments, which are, however, not to be interpreted as limiting the invention.

BRIEF DESCRIPTION OF THE DRAWINGS

All the figures are merely diagrammatic views of devices and systems according to the invention and their components. In particular, distances and size relationships are not to scale in the figures. Similar or identical elements in the various figures have the same reference numbers.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
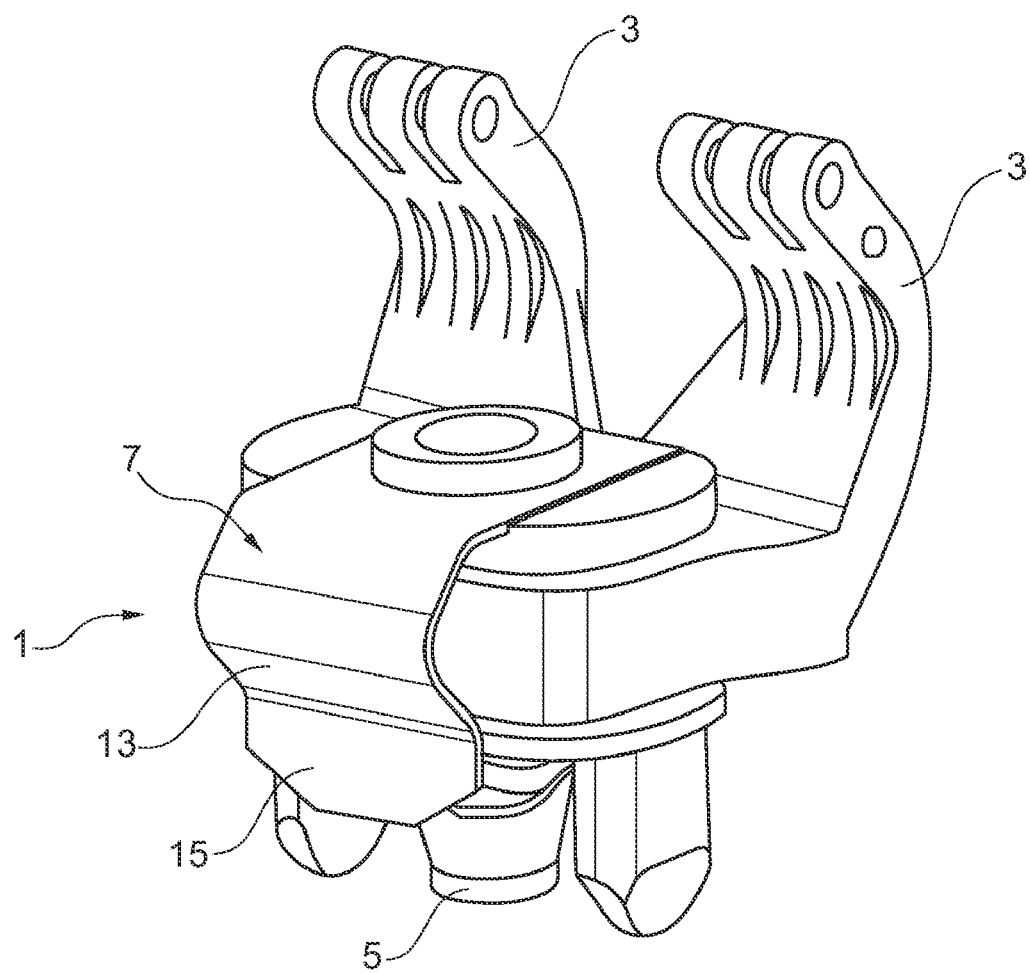
FIG. 1 diagrammatically shows a perspective view of an equipment holder with optional grid function according to an exemplary embodiment of the invention.

FIG. 1 diagrammatically shows a perspective view of an equipment holder 1 with an optional grid function according to an exemplary embodiment of the invention. The equipment holder 1 comprises two attachment elements 3 which can be pinned together or screwed together with the first cabin component 9, for example a passenger supply unit. Furthermore, the equipment holder 1 comprises a fixing element 5. The fixing element 5 is arranged beside the attachment elements 3 and is designed as a screw.

The position determination device 7 is also arranged beside the attachment elements 3. The position determination device 7 comprises an elastic grid element 13 with a lug 15. The attachment element 3, the fixing element 5 and the position determination device 7 are interconnected. Such interconnection can, for example, take place by means of the fixing element or a screw through the fixing element 5.

The design, according to the invention, of the equipment holder 1 with a position determination device 7 is advantageous because it allows an optional grid arrangement and positioning of the equipment holder 1 and possibly of a cabin component 19 attached thereto. This is achieved by optional insertion of the position determination device 7 into a rail 11 comprising notches 17.

Figure 2:
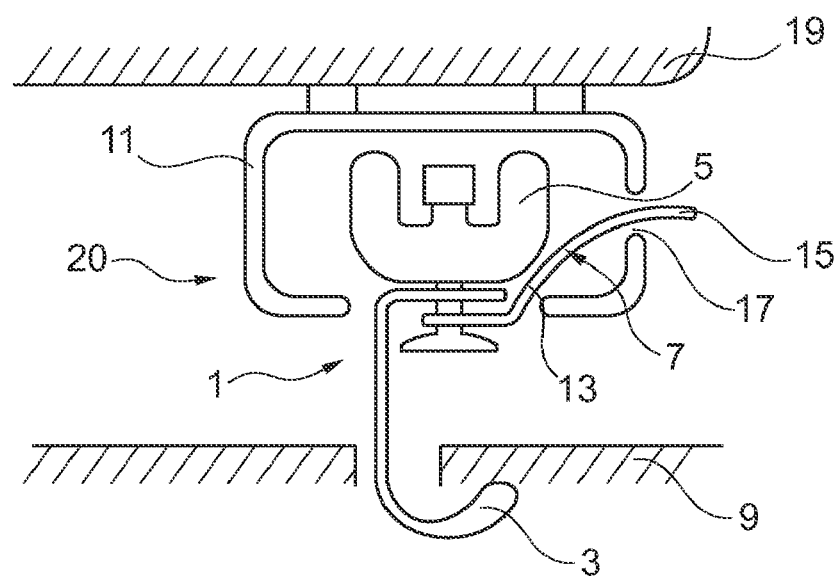
FIG. 2 diagrammatically shows a section view of a holding system according to an exemplary embodiment of the invention.

FIG. 2 diagrammatically shows a cross section of a holding system 20 according to an exemplary embodiment of the invention. The holding system 20 comprises an equipment holder 1 and a second cabin component 11, which in the embodiment shown is designed as a grid rail. The grid rail 11 is arranged on a third cabin component 19, which in the embodiment shown is an overhead stowage compartment (OHSC). In the example shown the equipment holder 1 is inserted in the grid rail 11.

The lug 15 of the position determination device 7 is locked in place in a recess 17 of the grid rail 11. On the attachment element 3 of the equipment holder 1 the first cabin component 9, for example a passenger supply unit, is attached. The position of the equipment holder 1 relative to the second cabin component 11 is discontinuously indicated by the recesses 17. In this arrangement the position signal is, for example, indicated visually by the lug 15 of the elastic grid element 13 showing through the recess 17 of the grid rail 11. After position determination it is possible, by means of the fixing element 5, to fix the position of the equipment holder 11, and thus also the position of the passenger supply unit attached thereto, within the grid rail 11.

Figure 3:
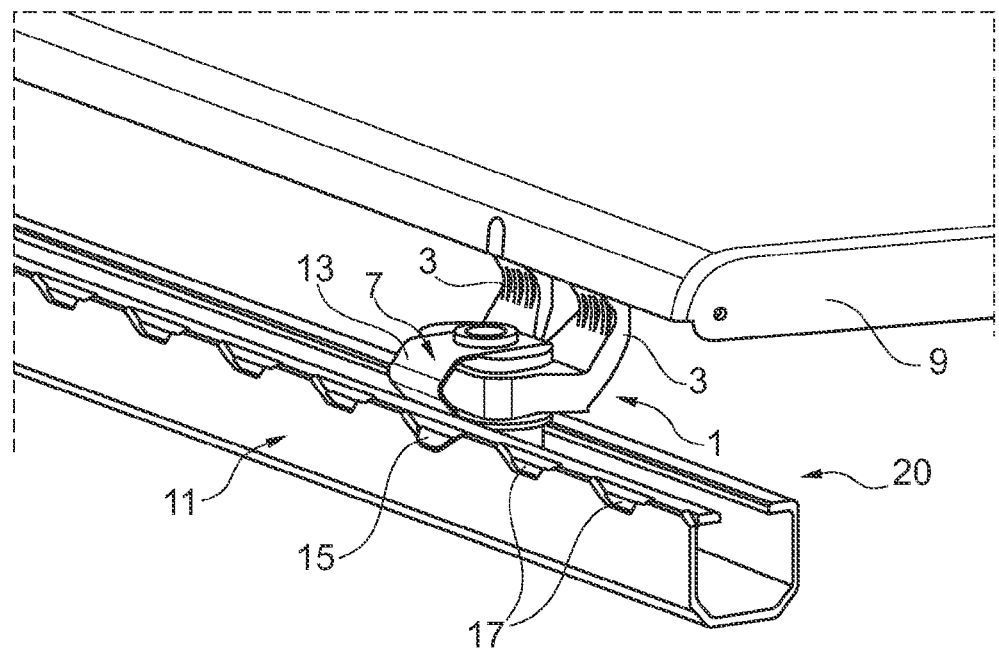
FIG. 3 diagrammatically shows a perspective view of a holding system, with the position determination device locked in place, according to an exemplary embodiment of the invention.

FIG. 3 diagrammatically shows a perspective view of a holding system 20, with the position determination device 7 locked in place, according to an exemplary embodiment of the invention.

In the illustration the first cabin component 9 is already attached by means of the attachment elements 3. The position determination device 7 is inserted in the grid rail 11 and is locked in place in a recess 17 of the grid rail 11. This is indicated by the lug 15 of the elastic grid element 13.

By inserting the position determination device 7 in the grid rail 11 and by moving the equipment holder 1 along within the grid rail 11, the position of the equipment holder 1 can be determined not only by touching it but also visually, and as an alternative acoustically by a latching sound.

Position determination is discontinuous, because in those instances where the position determination device 7 is not visible between the recesses 17 of the grid rail 11 precise position determination is not possible.

Figure 4:
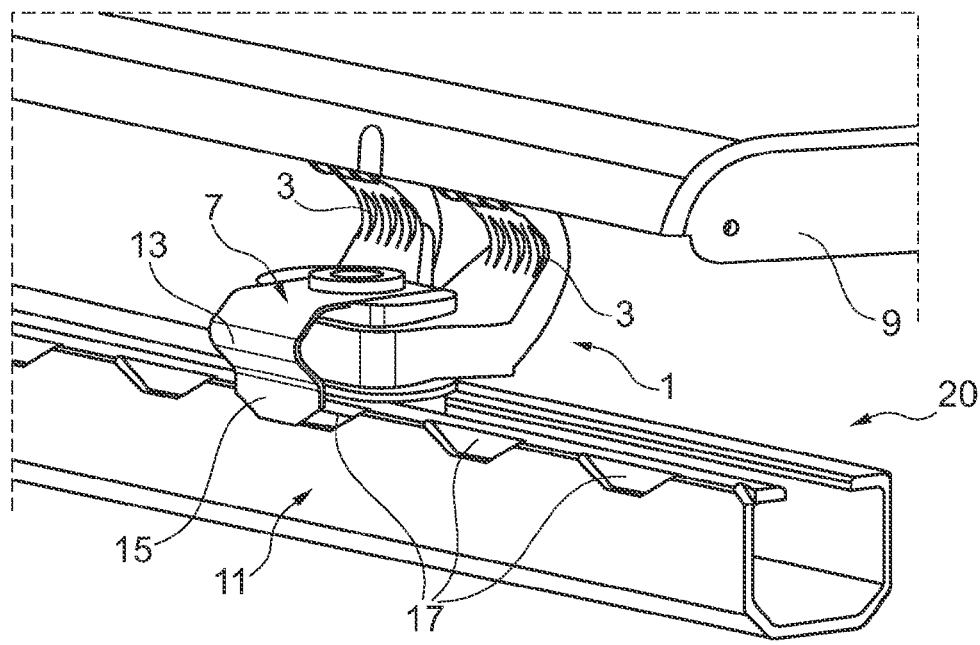
FIG. 4 diagrammatically shows a perspective view of a holding system, with the position determination device not locked in place, according to an exemplary embodiment of the invention.

FIG. 4 diagrammatically shows a perspective view of a holding system 20, with the position determination device 7 according to an exemplary embodiment of the invention not locked in place.

The equipment holder 1 is inserted in the grid rail 11. In this arrangement the position determination device 7 with the elastic grid element 13 and the lug 15 is bent in such a way that they are located outside the grid rail 11. This can, for example, be helpful if the equipment holder is to be fixed between two recesses 17 of the grid rail by means of the fixing element 5.

Figure 5:
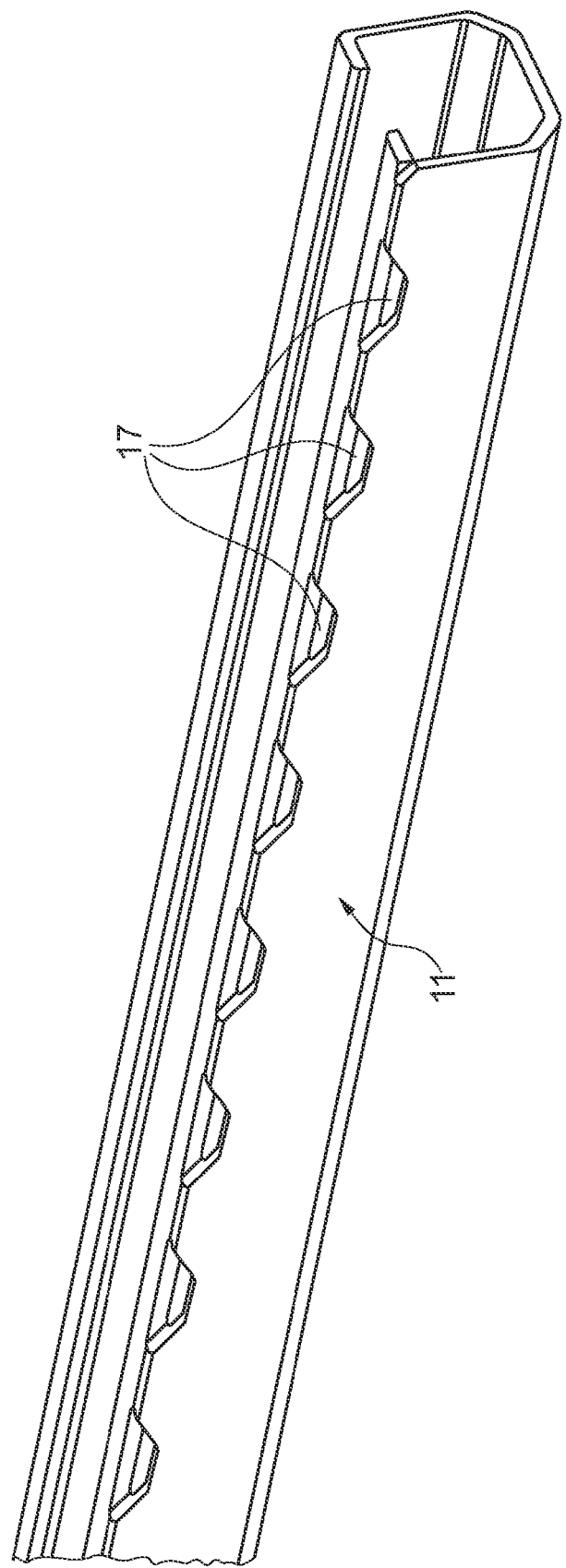
FIG. 5 diagrammatically shows a perspective view of a second cabin component.

FIG. 5 diagrammatically shows a perspective view of the second cabin component 11. The second cabin component 11 is designed as a grid rail with recesses 17.

Finally, it should be noted that expressions such as "comprising" or similar are not intended to be exclusive, but that further elements or steps can also be provided. Furthermore, it should be pointed out that "a" or "one" does not exclude a plural number. Moreover, characteristics described in conjunction with the various exemplary embodiments can be combined as desired. It should also be pointed out that the reference characters in the claims are not to be interpreted as limiting the scope of the claims.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. An equipment holder with an optional grid function for positioning a first cabin component of an aircraft relative to a second cabin component of the aircraft and for attaching at least two cabin components to each other, the equipment holder comprising:
    an attachment element;
    a fixing element; and
    a position determination device,
    wherein the attachment element is designed to attach the equipment holder to the first cabin component,
    wherein the fixing element is designed to fix a position of the equipment holder relative to the second cabin component, and
    wherein the position determination device is designed to discontinuously indicate the position of the equipment holder relative to the second cabin component with a position signal and the position determination device is designed so as to be flexible in such a manner that optionally it can be inserted from the inside into a recess of the second cabin component.

2. The equipment holder according to claim 1, wherein the position determination device is designed as an elastic grid element with a lug, and
    wherein the lug is designed to enter into a selected recess of the second cabin component.

3. The equipment holder according to claim 2, wherein the lug is designed to leave the selected recess of the second cabin component in response to a predetermined lateral or frontal pressure.

4. The equipment holder according to claim 1, wherein the equipment holder is designed to be inserted in a grid rail.

5. The equipment holder according to claim 1, wherein the fixing element is furthermore designed to fix a third cabin component of the aircraft relative to the first cabin component.

6. The equipment holder according to claim 1, wherein the position signal comprises at least one signal from a following signal group consisting of: a tactile signal, a visual signal or an acoustic signal.

7. A holding system with an optional grid function for positioning cabin components of an aircraft relative to each other and for attaching the cabin components to each other, with the holding system comprising:
    an equipment holder, the equipment holder comprising:
        an attachment element;
        a fixing element; and
        a position determination device,
        wherein the attachment element is designed to attach the equipment holder to a first cabin component,
        wherein the fixing a second cabin component element is designed to fix a position of the equipment holder relative to the second cabin component, and
        wherein the position determination device is designed to discontinuously indicate the position of the equipment holder relative to a second cabin component with a position signal and the position determination device is designed so as to be flexible in such a manner that optionally it can be inserted from the inside into a recess of the second cabin component,
    wherein the second cabin component comprises coding with which the position determination device is adapted to interact during discontinuous determination of the position of the equipment holder relative to the second cabin component.

8. The holding system according to claim 7, wherein the second cabin component is designed as a grid rail with recesses.

9. The holding system according to claim 7, wherein the first cabin component is a passenger supply unit.

10. A method for positioning a first cabin component of an aircraft relative to a second cabin component of the aircraft and for attaching at least two cabin components to each other with a equipment holder that comprises an attachment element; a fixing element; and a position determination device, the attachment element is designed to attach the equipment holder to the first cabin component, the fixing element is designed to fix a position of the equipment holder relative to the second cabin component, and the position determination device is designed to discontinuously indicate the position of the equipment holder relative to the second cabin component with a position signal, the method comprising:
    attaching the equipment holder to the first cabin component with the attachment element;
    guiding the equipment holder along the second cabin component with recesses;
    determining the position of the equipment holder relative to the second cabin component by means of a discontinuous position signal using the position determination device, the position determination device designed so as to be flexible in such a manner that optionally it can be inserted from the inside into a recess of the second cabin component; and
    fixing the position of the equipment holder relative to the second cabin component by means of the fixing element.

11. The method according to claim 10, wherein the determining the position of the equipment holder relative to the second cabin component using the position signal by means of the position determination device is optional.

12. An aircraft, comprising:
    a first cabin component;
    a second cabin component; and
    an equipment holder with an optional grid function for positioning the first cabin component relative to the second cabin component and for attaching the first cabin component to the second cabin component, the equipment holder comprising:
        an attachment element;
        a fixing element; and
        a position determination device,
        wherein the attachment element is designed to attach the equipment holder to the first cabin component,
        wherein the fixing element is designed to fix a position of the equipment holder relative to the second cabin component, and
        wherein the position determination device is designed to discontinuously indicate the position of the equipment holder relative to the second cabin component with a position signal, and the position determination device is designed so as to be flexible in such a manner that optionally it can be inserted from the inside into a recess of the second cabin component.

13. The aircraft according to claim 12, further comprising:
    a passenger supply unit; and
    an overhead stowage compartment,
    wherein the equipment holder is designed to position the passenger supply unit and the overhead stowage compartment relative to each other, and to attach them to each other.

* * * * *